UNITED STATES PATENT OFFICE.

DAVID CROCKETT, OF BIRMINGHAM, ALABAMA.

COMPOUND FOR FORMING PAVING.

984,543.  Specification of Letters Patent.  Patented Feb. 21, 1911.

No Drawing.  Application filed June 4, 1910. Serial No. 565,024.

*To all whom it may concern:*

Be it known that I, DAVID CROCKETT, a citizen of the United States, residing at Birmingham, in the county of Jefferson and State of Alabama, have invented certain new and useful Improvements in Compounds for Forming Pavings; and I do hereby declare the following to be a full, clear, and exact description of the invention, such as will enable others skilled in the art to which it appertains to make and use the same.

My invention relates to new and useful improvements in compounds for forming pavings, such as street surfaces, sidewalks, etc., and my object is to commingle certain ingredients, which will form a solid wearing surface, and, A further object is to apply an acid, whereby the wearing qualities of the ingredients will be enhanced.

In carrying out my invention, I employ coal tar or pine tar, hydrated lime, sand, broken stone, slag or similar substances and acetic acid in the following proportions by volume, for producing twelve cubic feet of surface, viz: tar, 1 cu. ft.; hydrated lime, 1 cu. ft.; sand, 3 cu. ft.; stone, etc., 7 cu. ft.; acetic acid, .12 cu. ft. The acetic acid must contain from two to ten per cent. pure acid. If desired, cement may be substituted for the lime, or one half portion of lime and one half portion of cement may be used.

In preparing the compound, the one portion of tar is placed in any suitable form of receptacle and brought to the boiling point, after which the hydrated lime is added thereto and the two ingredients stirred until they are thoroughly commingled. The mixture of tar and lime is maintained at the boiling point for one hour, more or less, when the sand is added thereto and this product stirred until thoroughly mixed. The aggregate of stone, etc., is then added and after being partially mixed with the preparation of tar, lime and sand, the acetic acid is introduced into the mixture, which will create a bubbling action and this together with the stirring of the product thoroughly mixes or commingles the different ingredients.

The addition of the acid will tend to toughen or strengthen the composition and will solidify the tar to such an extent as to prevent the same from becoming softened and sticky. Instead of adding the acid after the sand and stone have been mixed with the tar and lime, said acid may be administered before the sand and stone are introduced, but by so doing, the boiling or bubbling properties used for better commingling the parts of the composition will be lost.

After the various ingredients employed for producing the compound have been properly treated and commingled, the product is deposited upon the road way, sidewalk or other place to be covered with the paving, while in a warm state and as soon as deposited, a heavy roller or other form of weight is applied thereto, which will closely unite the various ingredients and produce a solid paving or wearing surface.

What I claim is:—

1. A compound, comprising tar, lime, sand, cracked stone and acetic acid in the proportions specified and commingled in the manner set forth.

2. A compound, comprising tar, hydrated lime, sand, a suitable aggregate and acetic acid in the proportions and commingled as specified.

3. A compound, comprising tar, lime and cement, sand, an aggregate and acetic acid in the proportions specified and commingled as set forth.

In testimony whereof I have signed my name to this specification in the presence of two subscribing witnesses.

DAVID CROCKETT.

Witnesses:
CAREY S. FRYE,
SAM'L W. COCKRELL.